(12) United States Patent
Harris et al.

(10) Patent No.: US 6,444,364 B1
(45) Date of Patent: Sep. 3, 2002

(54) HIGH PERFORMANCE BATTERY

(75) Inventors: Peter Harris, Stow; David Adamson, Ashland; Douglas Woodnorth, Needham; Barbara Brys, Bedford, all of MA (US); Martin Howard, Wilton, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/563,185

(22) Filed: May 2, 2000

Related U.S. Application Data

(63) Continuation of application No. 09/259,740, filed on Feb. 26, 1999, now abandoned.

(51) Int. Cl.$^7$ ................................. H01M 4/50
(52) U.S. Cl. ................ 429/224; 429/165; 429/131; 429/167
(58) Field of Search ............... 429/224, 218.1, 429/209, 208, 176, 163, 131, 229, 239, 246, 165, 167, 144

(56) References Cited

U.S. PATENT DOCUMENTS

| | | | |
|---|---|---|---|
| 2,647,938 A | 8/1953 | Taylor | 136/107 |
| 2,993,947 A | 7/1961 | Leger | 136/107 |
| 3,306,776 A | 2/1967 | Tamminen | 136/107 |
| 3,379,569 A | 4/1968 | Berger et al. | 136/6 |
| 3,893,870 A | 7/1975 | Kozawa | 136/107 |
| 3,894,889 A | 7/1975 | Gillman et al. | 136/148 |

(List continued on next page.)

FOREIGN PATENT DOCUMENTS

| | | |
|---|---|---|
| CA | 1 263 697 | 12/1989 |
| JP | 5679854 | 6/1981 |
| JP | 5753067 | 3/1982 |
| JP | 57170455 A | 10/1982 |
| JP | 58129764 A | 8/1983 |
| JP | 58-189963 A | 11/1983 |
| JP | 59014269 A | 1/1984 |
| JP | 62211863 A | 9/1987 |
| JP | 63218161 A | 9/1988 |
| JP | 63232266 A | 9/1988 |
| JP | 01035870 A | 2/1989 |
| JP | 01281672 A | 11/1989 |
| JP | 04174964 A | 6/1992 |
| JP | 05225966 A | 9/1993 |
| JP | 05335006 A | 12/1993 |
| JP | 06045002 A | 2/1994 |
| JP | 07282802 A | 10/1995 |
| JP | 07335227 A | 12/1995 |
| JP | 08138686 A | 5/1996 |
| JP | 09115516 A | 5/1997 |
| JP | 09115522 A | 5/1997 |
| JP | 09180736 A | 7/1997 |
| WO | WO 94/24709 | 10/1994 |
| WO | WO 98/15987 | 4/1998 |
| WO | WO 99/34462 | 7/1999 |

OTHER PUBLICATIONS

Test results of some prior art alkaline batteries.
Chemical and physical parameters of some prior art alkaline batteries.
Woodnorth et al., U.S. Ser. No. 09/054,928, filed Apr. 3, 1998.
Harris et al., U.S. Ser. No. 09/054,939, filed Apr. 3, 1998.

* cited by examiner

*Primary Examiner*—Patrick Ryan
*Assistant Examiner*—R. Alejandro
(74) *Attorney, Agent, or Firm*—Fish & Richardson P.C.

(57) ABSTRACT

A battery, such as an alkaline battery, that can provide a high energy output at a high rate and that has a relatively high ratio of manganese dioxide to cathode volume is disclosed. The battery can provide high energy output at a high rate when the battery is intermittently subjected to a high energy load.

23 Claims, 1 Drawing Sheet

U.S. PATENT DOCUMENTS

| | | | | |
|---|---|---|---|---|
| 3,905,835 | A | 9/1975 | Kasai | 136/111 |
| 3,925,102 | A | 12/1975 | Kozawa | 136/111 |
| 3,970,472 | A | 7/1976 | Steffensen | 136/3 |
| 4,091,178 | A | 5/1978 | Kordesch | 429/60 |
| 4,105,815 | A | 8/1978 | Buckler | 429/152 |
| 4,112,205 | A | 9/1978 | Charkoudian et al. | 429/199 |
| 4,121,018 | A | 10/1978 | Kocherginsky et al. | 429/27 |
| 4,125,638 | A | 11/1978 | Watanabe et al. | 429/199 |
| 4,133,856 | A | 1/1979 | Ikeda et al. | 264/63 |
| 4,163,811 | A | 8/1979 | Kohlmayr et al. | 427/115 |
| 4,172,183 | A | 10/1979 | Rüetschi | 429/128 |
| 4,177,157 | A | 12/1979 | Adams | 252/182.1 |
| 4,192,914 | A | 3/1980 | Ruetschi | 429/206 |
| 4,197,366 | A | 4/1980 | Tamura et al. | 429/197 |
| 4,197,367 | A | 4/1980 | Deborski | 429/223 |
| 4,209,574 | A | 6/1980 | Ruetschi | 429/133 |
| 4,209,577 | A | 6/1980 | Clash | 429/206 |
| 4,216,045 | A | 8/1980 | Morioka | 156/242 |
| 4,216,279 | A | 8/1980 | Mellors | 429/191 |
| 4,224,391 | A | 9/1980 | Eisenberg | 429/203 |
| 4,260,669 | A | 4/1981 | Kerg | 429/215 |
| 4,268,589 | A | 5/1981 | Tamminen | 429/207 |
| 4,269,691 | A | 5/1981 | Deborski | 204/290 R |
| 4,273,841 | A | 6/1981 | Carlson | 429/199 |
| 4,281,046 | A | 7/1981 | Davis, Jr. | 429/72 |
| 4,288,506 | A | 9/1981 | Coetzer et al. | 429/199 |
| 4,297,231 | A | 10/1981 | Kahara et al. | 252/182.1 |
| 4,306,005 | A | 12/1981 | Ruben | 429/206 |
| 4,310,609 | A | 1/1982 | Liang et al. | 429/194 |
| 4,324,828 | A | 4/1982 | Ebato et al. | 429/209 |
| 4,330,602 | A | 5/1982 | O'Rell et al. | 429/206 |
| 4,366,215 | A | 12/1982 | Coetzer et al. | 429/199 |
| 4,378,414 | A | 3/1983 | Furukawa et al. | 429/144 |
| 4,379,817 | A | 4/1983 | Kozawa | 429/224 |
| 4,405,699 | A | 9/1983 | Kruger | 429/192 |
| 4,419,423 | A | 12/1983 | Leger | 429/197 |
| 4,421,834 | A | 12/1983 | Zupancic | 429/105 |
| 4,427,751 | A | 1/1984 | Furukawa et al. | 429/206 |
| 4,455,358 | A | 6/1984 | Graham et al. | 429/190 |
| 4,465,747 | A | 8/1984 | Evans | 429/194 |
| 4,466,470 | A | 8/1984 | Bruder | 141/1.1 |
| 4,478,921 | A | 10/1984 | Langan | 429/194 |
| 4,490,449 | A | 12/1984 | Moses et al. | 429/196 |
| 4,595,643 | A | 6/1986 | Koshiba et al. | 429/27 |
| 4,604,336 | A | 8/1986 | Nardi | 429/224 |
| 4,636,445 | A | 1/1987 | Yamano et al. | 429/53 |
| 4,734,344 | A | 3/1988 | Choi | 429/206 |
| 4,767,687 | A | 8/1988 | LaBonte | 429/206 |
| 4,777,100 | A | 10/1988 | Chalilpoyil et al. | 429/59 |
| 4,778,737 | A | 10/1988 | Sehm | 429/206 |
| 4,869,980 | A | 9/1989 | Jarvis et al. | 429/202 |
| 4,894,296 | A | 1/1990 | Borbely et al. | 429/27 |
| 4,942,101 | A | 7/1990 | Audebert et al. | 429/165 |
| 4,957,827 | A | 9/1990 | Kordesch et al. | 429/60 |
| 4,959,282 | A | 9/1990 | Dahn et al. | 429/224 |
| 4,977,045 | A | 12/1990 | Mohri | 429/192 |
| 5,011,752 | A | 4/1991 | Kordesch et al. | 429/206 |
| 5,026,617 | A | 6/1991 | Kosaka et al. | 429/206 |
| 5,051,323 | A | 9/1991 | Murphy | 429/165 |
| 5,069,988 | A | 12/1991 | Tomantschger et al. | 429/59 |
| 5,108,852 | A | 4/1992 | Tomantschger et al. | 429/66 |
| 5,112,705 | A | 5/1992 | Hunter et al. | 429/206 |
| 5,132,177 | A | 7/1992 | Kawano et al. | 429/206 |
| 5,156,934 | A | 10/1992 | Kainthia et al. | 429/224 |
| 5,162,169 | A | 11/1992 | Tomantschger et al. | 429/59 |
| 5,204,195 | A | 4/1993 | Tomantschger et al. | 429/59 |
| 5,215,836 | A | 6/1993 | Eisenberg | 429/199 |
| 5,219,685 | A | 6/1993 | Taniguchi et al. | 429/217 |
| 5,277,890 | A | 1/1994 | Wang et al. | 423/605 |
| 5,281,497 | A | 1/1994 | Kordesch et al. | 429/224 |
| 5,283,139 | A * | 2/1994 | Newman et al. | 429/224 |
| 5,302,475 | A | 4/1994 | Adler et al. | 429/207 |
| 5,308,711 | A | 5/1994 | Passaniti et al. | 429/29 |
| 5,308,714 | A | 5/1994 | Crespi | 429/59 |
| 5,318,866 | A | 6/1994 | Degen et al. | 429/254 |
| 5,336,571 | A | 8/1994 | Tomantschger et al. | 429/66 |
| 5,340,666 | A | 8/1994 | Tomantschger et al. | 429/59 |
| 5,348,726 | A | 9/1994 | Wang et al. | 423/605 |
| 5,378,562 | A | 1/1995 | Passaniti et al. | 429/224 |
| 5,424,145 | A | 6/1995 | Tomantschger et al. | 429/57 |
| 5,453,336 | A | 9/1995 | Adler et al. | 429/207 |
| 5,455,125 | A | 10/1995 | Matsumoto et al. | 429/59 |
| 5,464,709 | A | 11/1995 | Getz et al. | 429/229 |
| 5,482,798 | A | 1/1996 | Mototani et al. | 429/224 |
| 5,489,492 | A | 2/1996 | Asami et al. | 429/212 |
| 5,489,493 | A | 2/1996 | Urry | 429/224 |
| 5,514,488 | A | 5/1996 | Hake et al. | 429/122 |
| 5,556,720 | A | 9/1996 | Charkey | 429/59 |
| 5,561,006 | A | 10/1996 | Lecerf et al. | 429/218 |
| 5,569,558 | A | 10/1996 | Takeuchi et al. | 429/122 |
| 5,569,561 | A | 10/1996 | Exnar et al. | 429/218 |
| 5,571,640 | A | 11/1996 | Takeuchi et al. | 429/209 |
| 5,585,208 | A | 12/1996 | Lian et al. | 429/190 |
| 5,604,057 | A | 2/1997 | Nazri | 429/224 |
| 5,607,796 | A | 3/1997 | Jacus et al. | 429/165 |
| 5,626,988 | A | 5/1997 | Daniel-Ivad et al. | 429/229 |
| 5,639,576 | A | 6/1997 | Lewis et al. | 429/218 |
| 5,652,043 | A | 7/1997 | Nitzan | 428/209 |
| 5,654,112 | A | 8/1997 | Itou et al. | 429/192 |
| 5,660,953 | A | 8/1997 | Bai et al. | 429/224 |
| 5,674,644 | A | 10/1997 | Nazri | 429/224 |
| 5,919,588 | A * | 7/1999 | Jose et al. | 429/224 |

HIGH PERFORMANCE BATTERY

This application is a continuation of U.S. Se. No. 09/529,704, filed Feb. 26, 1999, now abandoned.

BACKGROUND OF THE INVENTION

The invention relates to batteries.

Batteries, such as alkaline batteries, are commonly used as energy sources. Generally, alkaline batteries have a cathode, an anode, a separator and an electrolytic solution. The cathode is typically formed of an active material (e.g., manganese dioxide), carbon particles and a binder. The anode can be formed of gel including an active material (e.g., zinc particles). The separator is usually disposed between the cathode and the anode. The electrolytic solution, which is dispersed throughout the battery, can be a hydroxide solution.

It can be desirable for a battery to provide high energy output at a high rate. Generally, such a battery is designed by increasing the surface area of active cathode material (e.g., manganese dioxide) in contact with the electrolytic solution. The surface area of the active cathode material in contact with the electrolytic solution can be increased by increasing the porosity of the active cathode material. The porosity of the cathode can be increased by decreasing the amount of active material in the cathode. As a result, in batteries designed to provide a high energy output at a high rate, the ratio of the mass of the active cathode material to cathode volume is relatively low.

SUMMARY OF THE INVENTION

The invention relates to batteries that have a cathode with a relatively high ratio of manganese dioxide to cathode volume and that can provide high energy output at a high rate when intermittently subjected to a high energy load. The batteries are not limited by their size (e.g., AA, AAA, AAAA, C or D), but a battery's high rate performance and ratio of manganese dioxide to cathode volume generally vary depending upon the size of the battery.

In one aspect, the invention features a battery, preferably a AA battery, that includes a cathode, an anode and a separator disposed between the anode and the cathode. The cathode contains at least 2.8 grams of manganese dioxide per cubic centimeter of cathode volume. The battery takes at least 1.6 hours to discharge to 1.1 Volts according to the pulsed test.

As used herein, "the pulsed test" refers to a test in which a battery is discharged from its open circuit voltage to a particular final voltage at a rate that alternates between 1 Watt (3 second pulses) and 0.1 Watt (7 second pulses).

In another aspect, the invention features a battery, preferably a AA battery, that-includes a cathode, an anode and a separator disposed between the anode and the cathode. The cathode contains at least 2.8 grams of manganese dioxide per cubic centimeter of cathode volume. The battery takes at least 2.85 hours to discharge to 0.9 Volts according to the pulsed test.

In a further aspect, the invention features a battery, preferably a AAA battery, that includes a cathode, an anode and a separator disposed between the anode and the cathode. The cathode contains at least 2.85 grams of manganese dioxide per cubic centimeter of cathode volume. The battery takes at least 0.5 hours to discharge to 1.1 Volts according to the pulsed test.

In another aspect, the invention features a battery, preferably a AAA battery, that includes a cathode, an anode and a separator disposed between the anode and the cathode. The cathode contains at least 2.85 grams of manganese dioxide per cubic centimeter of cathode volume. The battery takes at least 0.8 hours to discharge to 0.9 Volts according to the pulsed test.

The batteries can have a relatively large inner cathode diameter, a relatively large inner volume, a relatively low ratio of zinc to electrolytic solution and/or a relatively low porosity.

BRIEF DESCRIPTION OF THE DRAWING

The FIGURE is a cross-sectional view of a battery.

DESCRIPTION OF THE PREFERRED EMBODIMENTS

Figure 1:
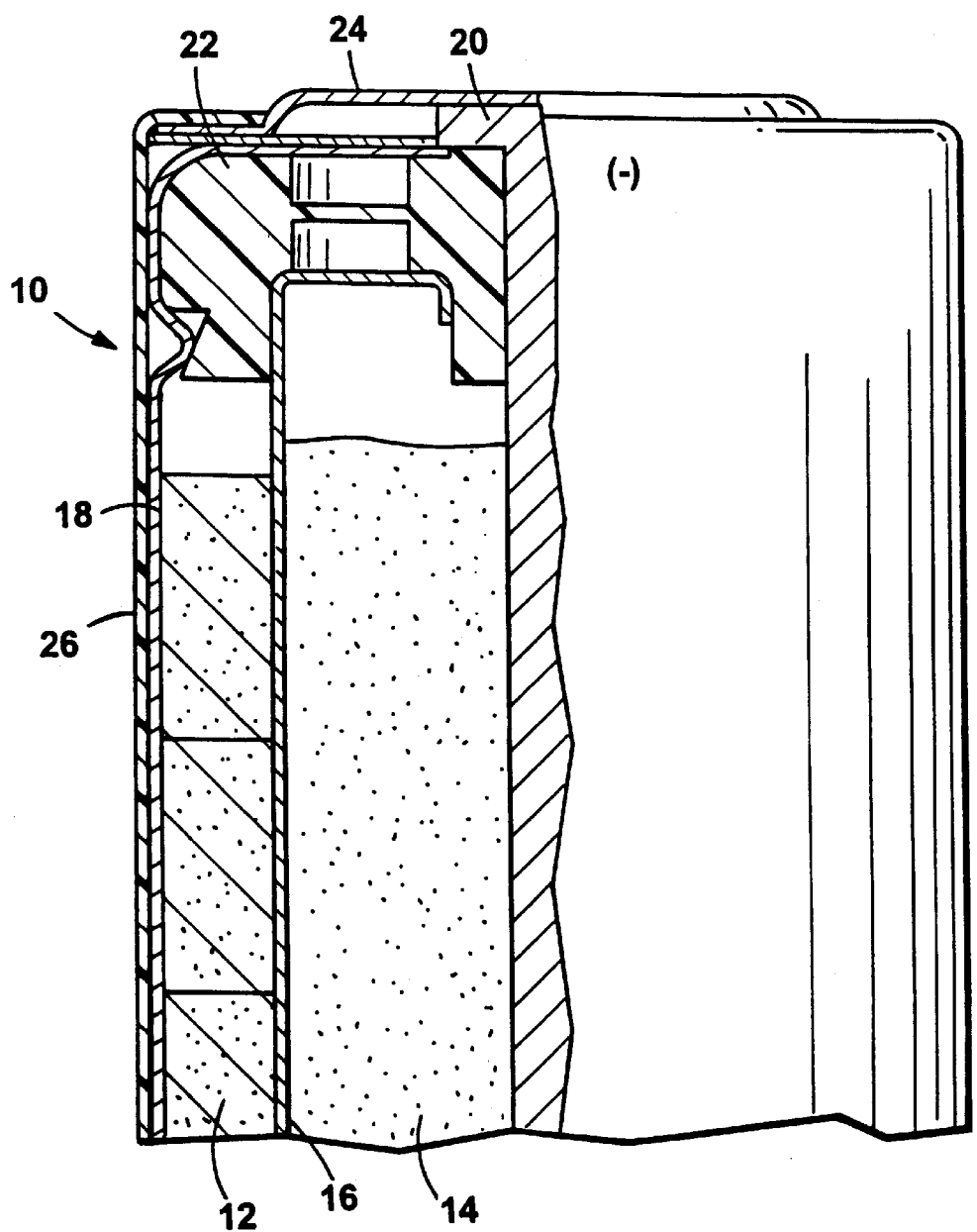

The preferred batteries are alkaline batteries that have a cathode with a relatively high ratio of manganese dioxide to cathode volume and that take a relatively long time to discharge from open circuit voltage to a particular final voltage according to the pulsed test. The batteries are not limited by their size (e.g., AA, AAA, AAAA, C or D), but the values for these parameters generally vary depending upon the size of the battery.

The cathode in a preferred AA battery contains at least 2.8 grams of manganese dioxide per cubic centimeter of cathode volume, more preferably at least 2.85 grams of manganese dioxide per cubic centimeter of cathode volume, and most preferably at least 2.9 grams of manganese dioxide per cubic centimeter of cathode volume.

The preferred AA battery takes at least 1.6 hours to discharge from 1.6 Volts (i.e., its open circuit voltage) to 1.1 Volts according to the pulsed test, more preferably at least 1.65 hours to discharge from 1.6 Volts to 1.1 Volts according to the pulsed test, and most preferably at least 1.7 hours to discharge from 1.6 hours to 1.1 Volts according to the pulsed test.

The preferred AA battery takes at least 2.85 hours to discharge from 1.6 Volts to 0.9 Volts according to the pulsed test, more preferably at least 2.95 hours to discharge from 1.6 Volts to 0.9 Volts according to the pulsed test, and most preferably at least 3.0 hours to discharge from 1.6 Volts to 0.9 Volts according to the pulsed test.

An example of a preferred AA battery has a cathode containing 2.95 grams of manganese dioxide per cubic centimeter of cathode volume. This battery takes 1.73 hours to discharge from 1.6 Volts to 1.1 Volts according to the pulsed test, and 3.08 hours to discharge from 1.6 Volts to 0.9 Volts according to the pulsed test.

The cathode in a preferred AAA battery contains at least 2.75 grams of manganese dioxide per cubic centimeter of cathode volume, more preferably at least 2.85 grams of manganese dioxide per cubic centimeter of cathode volume, and most preferably at least 2.9 grams of manganese dioxide per cubic centimeter of cathode volume.

The preferred AAA battery takes at least 0.5 hours to discharge from 1.6 Volts to 1.1 Volts according to the pulsed test, more preferably at least 0.55 hours to discharge from 1.6 Volts to 1.1 Volts according to the pulsed test, and most preferably at least 0.6 hours to discharge from 1.6 Volts to 1.1 Volts according to the pulsed test.

The preferred AAA battery takes at least 0.80 hours to discharge from 1.6 Volts to 0.9 Volts according to the pulsed test, more preferably at least 0.85 hours to discharge from 1.6 Volts to 0.9 Volts according to the pulsed test, and most preferably at least 0.90 hours to discharge from 1.6 Volts to 0.9 Volts according to the pulsed test.

An example of a preferred AAA battery has a cathode containing 2.9 grams of manganese dioxide per cubic centimeter of cathode volume. This battery takes 0.59 hours to discharge from 1.6 Volts to 1.1 Volts according to the pulsed test, and 0.93 hours to discharge from 1.6 Volts to 0.9 Volts according to the pulsed test.

Referring to the FIGURE, a battery 10 is shown that has a cathode 12, an anode 14, a separator 16, an outer wall 18 that contacts the outer diameter of cathode 12 and insulating layer 26. Battery 10 further includes an anode collector 20 that passes through a seal member 22 and into anode 14. The upper end of anode collector 20 is connected to a negative end cap 24 which serves as the negative external terminal of battery 10. layer 26 can be formed of an electrically non-conducting material, such as heat shrinkable plastic. In addition, an electrolytic solution is dispersed throughout battery 10.

The preferred batteries have a relatively large interior volume, which can be achieved by using certain seal designs. Such batteries are disclosed in U.S. Pat. No. 5,750,283 and co-pending and commonly assigned U.S. patent application Ser. No. 09/047,264, filed Mar. 24, 1998, now U.S. Pat. No. , 6,127,062, which are hereby incorporated by reference.

The preferred cathode 12 has a relatively large inner diameter. In the preferred AA battery, cathode 12 has an inner diameter of at least 8.9 millimeters, more preferably at least 8.92 millimeters, and most preferably at least 8.94 millimeters. In the preferred AAA battery, cathode 12 has an inner diameter of at least 6.44 millimeters, more preferably at least 6.46 millimeters, and most preferably at least 6.46 millimeters.

Cathode 12 contains manganese dioxide and the electrolytic solution. Distributors-of manganese dioxide include Kerr McGee, Tosoh, Mitsui Chemicals and JMC.

Generally, the amount of manganese dioxide contained within cathode 12 varies depending upon the size of battery 10. In the preferred AA battery, cathode 12 contains from 9.6 to 9.7 grams of manganese dioxide, more preferably from 9.62 to 9.66 grams of manganese dioxide, and most preferably 9.64 grams of manganese dioxide. In the preferred AAA battery, cathode 12 contains from 4.15 to 4.25 grams of manganese dioxide, more preferably from 4.18 to 4.22 grams of manganese dioxide, and most preferably 4.2 grams of manganese dioxide.

The preferred cathode 12 also includes additional materials, such as electrically conductive particles (e.g., carbon particles, such as graphite particles), a binder and/or other additives. The "cathode volume" as used herein refers to the volume defined by the outer boundary of manganese dioxide and these materials contained in cathode 12.

In the preferred cathode 12, the amount of carbon particles is from 5 weight percent to 7 weight percent of cathode 12, more preferably from 5.5 weight percent to 6.5 weight percent of cathode 12, and most preferably from 6 weight percent to 6.3 weight percent of cathode 12. These weight percentages correspond to when the electrolytic solution is not dispersed within cathode 12.

Generally, the amount of carbon particles contained within the preferred cathode 12 varies depending upon the size of battery 10. In the preferred AA battery, cathode 12 contains from 0.6 to 0.85 grams of carbon particles, more preferably from 0.65 to 0.8 grams of carbon particles, and most preferably from 0.7 to 0.75 grams of carbon particles. In the preferred AAA battery, cathode 12 contains from 0.25 to 0.42 grams of carbon particles, more preferably from 0.27 to 0.4 grams of carbon particles, and most preferably from 0.3 to 0.37 grams of carbon particles.

The carbon particles that can be contained in cathode 12 may be natural or synthetic, and may be expanded or non-expanded. In the preferred cathode 12, the carbon particles can be natural, non-expanded carbon particles, available obtained from Brazilian Nacional de Grafite (Itapecirica, MG Brazil).

The size of the carbon particles is limited only by the dimensions of cathode 12. In the preferred cathode 12, the carbon particles have an average particle size (as measured using a HELIOS analyzer) of less than 20 microns, more preferably from 2 microns to 12 microns, and most preferably from 5 microns to 9 microns.

Cathode 12 can include one or more binders. Examples of binders include polyethylene powders (e.g., coathylene, available from Hoescht), polyacrylamides, Portland cement and fluorocarbon resins, such as PVDF and PTFE.

Preferably, cathode 12 contains less than 1 weight percent binder, more preferably from 0.1 weight percent to 0.5 weight percent binder, and most preferably 0.3 weight percent binder. These weight percentages correspond to when the electrolytic solution is not dispersed within cathode 12.

The preferred cathode 12 includes additional additives. Examples of these additives are disclosed in U.S. Pat. No. 5,342,712, which is hereby incorporated by reference. In some embodiments, cathode 12 can include less than 2 weight percent $TiO_2$, more preferably less than 1 weight percent $TiO_2$.

Cathode 12 can be formed of one or more pellets. The cathode pellets can be formed by first mixing the manganese dioxide with the optional materials (e.g., carbon particles and binder). The pellets are fit within battery 10 using standard processes. For example, in one process, a core rod is placed in the central cavity of battery 10, and a punch is then used to pressurize the top most pellet. When using this process, the interior of wall 18 can have one or more vertical ridges that are spaced circumferentially around wall 18. These ridges can assist in holding cathode 12 in place within battery 10.

In embodiments in which cathode 12 is formed of a single pellet, the powder can be placed directly within battery 10. A retaining ring can be set in place, and an extrusion rod can pass through the ring, densifying the powder and forming cathode 12.

Preferably, a layer of conductive material can be disposed between cathode 12 and wall 18. The layer can be disposed along the inner surface of wall 18, along the outer circumference of cathode 12, or both. Typically, the conductive-layer is formed of tin, cobalt, silver and/or a carbonaceous material. Such materials include LB1000 (Timcal), Eccocoat 257 (W. R. Grace & Co.), Electrodag 109 (Acheson Industries, Inc.), Electrodag 112 (Acheson) and EB0005 (Acheson). Methods of applying the conductive layer are disclosed in, for example, Canadian Patent No. 1,263,697, which is hereby incorporated by reference.

When cathode 12 is disposed within battery 10 by a pressing process, providing a conductive layer between wall 18 and cathode 12 can decrease the pressure used to place the pellet(s) within battery 10. Thus, the porosity of cathode 12 (i.e., the volume of cathode 12 that is not taken up by solid material, such as manganese dioxide, carbon particles and binder) can be made relatively high without causing the pellet(s) to be crushed or form cracks. Typically, the porosity of cathode 12 is from 22% to 26%, from 23% to 25% or from 23.5% to 24.5%.

Anode 14 can be formed of any of the standard zinc materials used in battery anodes. Preferably, anode 14 is formed of a gel that includes zinc-based particles, a gelling agent and minor amounts of gassing additives, such as gassing inhibitors. In addition, a portion of the electrolytic solution is dispersed within anode 14.

Anode 14 can include fine sized zinc-based particles, such as disclosed in commonly assigned and co-pending U.S. patent application Ser. No. 08/905,254, now U.S. Pat. No. 6,284,410, entitled Zinc Electrode Particle Form; Ser. No. 09/115,867, entitled Zinc-Based Electrode Particle Form; and Ser. No. 09/156,915, now abandoned, entitled Electrode Having Multi-Modal Distribution of Zinc-Based Particles, all of which are hereby incorporated by reference.

Preferably, anode 14 contains from 1.8 to 2.0 grams of zinc per cubic centimeter of anode volume, more preferably from 1.85 to 1.95 grams of zinc per cubic centimeter of anode volume, and most preferably from 1.88 to 1.92 grams of zinc per cubic centimeter of anode volume. The anode volume refers to the volume taken up by the zinc gel in anode 14.

Generally, the amount of zinc in anode 14 varies depending upon the size of battery 10. In the preferred AA battery, anode 14 contains from 4.1 to 4.4 grams of zinc, more preferably from 4.2 to 4.35 grams of zinc, and most preferably from 4.25 to 4.3 grams of zinc. In the preferred AAA battery, anode 14 contains from 1.6 to 1.85 grams of zinc, more preferably from 1.65 to 1.8 grams of zinc, and most preferably from 1.7 to 1.75 grams of zinc.

Anode 14 preferably includes from 63 weight percent to at least 73 weight percent zinc, more preferably at least from 65 weight percent to 71 weight percent zinc, and most preferably from 67 weight percent to 69 weight percent zinc. These weight percentages correspond to when the electrolytic solution is dispersed within anode 14.

Gelling agents that can be used in anode 14 include polyacrylic acids, grafted starch materials, salts of polyacrylic acids, polyacrylates, carboxymethylcellulose or combinations thereof. Examples of polyacrylic acids include Carbopol 940 (B. F. Goodrich) and Polygel 4P (3V), and an example of a grafted starch material is Waterlock A221 (Grain Processing Corporation, Muscatine, Iowa). An example of a salt of a polyacrylic acid is CL15 (Allied Colloids). The preferred anode 14 includes from 0.2 weight percent to 1 weight percent gelling agent, more preferably from 0.4 weight percent to 0.7 weight percent gelling agent, and most preferably from 0.5 weight percent to 0.6 weight percent gelling agent. These weight percentages correspond to when the electrolytic solution is dispersed within anode 14.

The electrolytic solution dispersed throughout battery 10 can be any of the standard electrolytic solutions used in batteries. Typically, the electrolytic solution is an aqueous hydroxide solution. Such aqueous hydroxide solutions include, for example, potassium hydroxide solutions and sodium hydroxide solutions. In the preferred battery 10, the electrolytic solution is an aqueous potassium hydroxide solution containing from 33 weight percent to 38 weight percent potassium hydroxide.

Generally, the amount of electrolytic solution contained in battery 10 depends upon the size of battery 10.

The preferred AA battery includes from 3.2 grams to 4.0 grams of electrolytic solution, more preferably from 3.4 grams to 3.8 grams of electrolytic solution, and most preferably from 3.6 grams to 3.7 grams of electrolytic solution.

The preferred AA battery contains from 0.80 to 1.0 grams of zinc per cubic centimeter of electrolytic solution, more preferably from 0.85 to 0.95 grams of zinc per cubic centimeter of electrolytic solution, and most preferably from 0.88 to 0.9 grams of zinc per cubic centimeter of electrolytic solution.

The preferred AA battery contains from 2.2 to 4.0 grams of manganese dioxide per cubic centimeter of electrolytic solution, more preferably from 2.3 to 2.9 grams of manganese dioxide per cubic centimeter of electrolytic solution, and most preferably from 2.5 to 2.7 grams of manganese dioxide per cubic centimeter of electrolytic solution.

The preferred AAA battery includes from 1.70 grams to 1.80 grams of electrolytic solution, more preferably from 1.71 grams to 1.78 grams of electrolytic solution, and most preferably from 1.73 grams to 1.76 grams of electrolytic solution.

The preferred AAA battery contains from 0.94 to 1.04 grams of zinc per cubic centimeter of electrolytic solution, more preferably from 0.96 to 1.02 grams of zinc per cubic centimeter of electrolytic solution, and most preferably from 0.98 to 1.0 grams of zinc per cubic centimeter of electrolytic solution.

The preferred AAA battery contains from 3.2 to 4.2 grams of manganese dioxide per cubic centimeter of electrolytic solution, more preferably from 3.4 to 4.0 grams of manganese dioxide per cubic centimeter of electrolytic solution, and most preferably from 3.6 to 3.8 grams of manganese dioxide per cubic centimeter of electrolytic solution.

Separator 16 can be formed of any of the standard materials used in battery separators. For example, separator 16 may be formed of two layers of non-woven material with a membrane layer disposed therebetween. The non-woven material can be formed of polyvinyl alcohol (PVA) and rayon, optionally containing a trace amount of surfactant. Such materials are available from PDM under the tradename PA36. The membrane layer can be formed of cellophane.

EXAMPLE I

AA batteries were prepared with the following components. The cathode included about 9.64 grams of manganese dioxide (Kerr-McGee, Co.), about 0.702 grams of nonsynthetic, nonexpanded graphite having an average particle size of from about 15 microns to about 20 microns (Brazilian Nacional de Grafite) and about 0.3 weight percent of coathylene HA-1681. The anode included about 4.2 grams of zinc particles, about 50 ppm surfactant (RM510, Rhone Poulenc) relative to zinc, and about 0.5 weight percent total gelling agent (Carbopol 940 and A221). The porosity of the cathode was about 24%, and the porosity of the anode was about 1.89 grams of zinc per cubic centimeter of anode. The separator was a two-sheet structure, having an outer sheet and an inner sheet. The outer sheet of separator was formed of three layers: cellophane, polyacrylic acid and a nonwoven material. The nonwoven material included about 80 weight percent PVA fibers and about 20 weight percent rayon fibers. The outer sheet was about 3.5 mils thick when dry and about 9 mils thick when wet. The basis weight was about 55 grams per square meter. The inner separator sheet consisted one layer of nonwoven material including about 80% PVA and about 20% rayon fibers. The inner sheet was about 2.5 mils thick when dry and about 8 mils thick when wet. The inner sheet had a basis weight of about 25 grams per square meter. The battery also included about 3.70 grams of an aqueous potassium hydroxide (about 35.5 weight percent potassium hydroxide) solution. A thin coating of EB005 (Acheson) was disposed between the outer wall of the battery and the outer periphery of the cathode.

The AA batteries were stored at a temperature of from about 20.1° C. to about 22.10° C. for five days. The AA batteries were then stored according to the following procedure.

Each battery is usually examined for leakage or material damage and identified such that battery identification can be maintained throughout the test program. The batteries are oriented on their sides in holding trays such that the batteries are not in physical contact with each other. The holding trays are made to be resistant to heat and electrolytes. The trays are stored for 1 day at ambient conditions, after which the trays are placed in a preheated chamber. The trays are spaced so that there is at least about 5 cm (2 inches) of space between the chamber wall, and the tray above, below, or adjacent to each tray. The following 24 hour test sequence, shown in Table I, is repeated for 14 days.

The trays are removed from the chamber and each battery is visually examined for leakage or material damage.

TABLE I

| Cycle Number | Time (Hrs.) | Temperature (±2° C.) |
|---|---|---|
| 1 | 6.0 | Ramp from 28 to 25 |
| 2 | 4.5 | Ramp from 25 to 34 |
| 3 | 2.0 | Ramp from 34 to 43 |
| 4 | 1.0 | Ramp from 43 to 48 |
| 5 | 1.0 | Ramp from 48 to 55 |
| 6 | 1.0 | Ramp from 55 to 48 |
| 7 | 1.0 | Ramp from 48 to 43 |
| 8 | 3.0 | Ramp from 43 to 32 |
| 9 | 4.5 | Ramp from 32 to 28 |
| | 24.0 (1 day) | |

The following tests were subsequently performed on individual AA batteries. Each test was conducted at a temperature of from about 20.1° C. to about 22.1° C.

A AA battery was discharged from an open circuit voltage of about 1.6 Volts under constant current conditions of ten seconds per minute for one hour per day ("the cc photo test"). The AA battery reached 1 Volt after 286 pulses, and the AA battery reached 0.9 Volts after 390 pulses.

A AA battery was continuously discharged from an open circuit voltage of about 1.6 Volts at 1 Watt ("the 1 Watt continuous test"). The AA battery reached 1 Volt after about 0.80 hours, and the AA battery reached 0.8 Volts after about 1.09 hours.

A AA battery was continuously discharged from an open circuit voltage of about 1.6 Volts at a rate that alternated between 1 Watt (3 second pulses) and 0.1 Watt (7 second pulses) ("the pulsed test"). The AA battery reached 1.1 Volt after about 1.73 hours, and the AA battery reached 0.9 Volts after about 3.08 hours.

A AA battery was discharged from an open circuit voltage of about 1.6 Volts at 0.5 Watts for 15 minutes per hour ("the half Watt rm test"). The AA battery reached 1.0 Volts after about 3.27 hours.

EXAMPLE II

A AAA battery was prepared. The cathode 12 included about 4.179 grams of manganese dioxide (Kerr McGee, Co.), about 0.309 grams of nonsynthetic, nonexpanded graphite having an average particle size of from about 15 microns to about 20 microns (Brazilian Nacional de Grafite) and about 0.3 weight percent of coathylene HA-1681. The anode 14 included about 1.7262 grams of zinc particles, about 50 ppm surfactant (RM 510, Rhone Poulenc) relative to zinc, and about 0.5 weight percent total gelling agent (Carbopol 940 and A221). The porosity of the cathode was about 24%, and the porosity of the anode was about 2.121 grams of zinc per cubic centimeter of anode 14. The separator was a two-sheet structure, having an outer sheet and an inner sheet. The outer sheet of separator was formed of three layers: cellophane, polyacrylic acid and a nonwoven material. The nonwoven material included about 80 weight percent PVA fibers and about 20 weight percent rayon fibers. The outer sheet was about 3.5 mils thick when dry and about 9 mils thick when wet. The basis weight was about 55 grams per square meter. The inner separator sheet consisted one layer of nonwoven material including about 80% PVA and about 20% rayon fibers. The inner sheet was about 2.5 mils thick when dry and about 8 mils thick when wet. The inner sheet had a basis weight of about 25 grams per square meter. The battery also included about 1.75 grams of an aqueous potassium hydroxide (about 35.5 weight percent) solution. A thin coating of EB005 (Acheson) was disposed between the outer wall of the battery and the outer periphery of the cathode.

The AAA batteries were stored as described in Example I. Each AAA battery was discharged from an open circuit voltage of about 1.6 Volts, and the tests were conducted within the temperature range described in Example I.

A AAA battery was continuously discharged from an open circuit voltage of about 1.6 Volts at one half Watt ("the half Watt continuous test"). The AAA battery reached 1 Volt after about 0.87 hours, and the AAA battery reached 0.8 Volts after about 1.05 hours.

With the pulsed test, a AAA battery took about 0.59 hours to reach 1.1 Volt, and about 0.93 hours to reach 0.9 Volts.

With the half Watt rm test, a AAA battery took about 1.0 hour to reach 1 Volt.

A AAA battery was discharged from an open circuit voltage of about 1.6 Volts at 0.25 watts for one hour per day. The AAA battery reached 0.8 Volts after about 3.95 hours.

Other embodiments are within the claims.

What is claimed is:

1. A AA battery, comprising:
   an outer insulating layer;
   an outer wall on the inside of the insulating layer and having an inner surface;
   a conductive layer on the inner surface;
   a cathode adjacent the conductive layer and containing at least 2.8 grams of manganese dioxide per cubic centimeter of cathode volume;
   an anode inside the cathode; and
   a separator disposed between the cathode and the anode, wherein the battery takes at least 1.6 hours to discharge from 1.6 Volts to 1.1 Volts according to the pulsed test.

2. The battery of claim 1, wherein the cathode contains at least 2.9 grams of manganese dioxide per cubic centimeter of cathode volume.

3. The battery of claim 1, wherein the cathode contains at least 2.95 grams of manganese dioxide per cubic centimeter of cathode volume.

4. The battery of claim 1, wherein the battery takes at least 1.65 hours to discharge from 1.6 Volts to 1.1 Volts according to the pulsed test.

5. The battery of claim 1, wherein the battery takes at least 1.7 hours to discharge from 1.6 Volts to 1.1 Volts according to the pulsed test.

6. A AA battery, comprising:
   an outer insulating layer;

an outer wall on the inside of the insulating layer and having an inner surface;

a conductive layer on the inner surface;

a cathode adjacent the conductive layer and containing at least 2.8 grams of manganese dioxide per cubic centimeter of cathode volume;

an anode inside the cathode; and a separator disposed between the cathode and the anode, wherein the battery takes at least 2.85 hours to discharge from 1.6 Volts to 0.9 Volts according to the pulsed test.

7. The battery of claim 6, wherein the cathode contains at least 2.9 grams of manganese dioxide per cubic centimeter of cathode volume.

8. The battery of claim 6, wherein the cathode contains at least 2.95 grams of manganese dioxide per cubic centimeter of cathode volume.

9. The battery of claim 6, wherein the battery takes at least 2.95 hours to discharge from 1.6 Volts to 0.9 Volts according to the pulsed test.

10. The battery of claim 6, wherein the battery takes at least 3.0 hours to discharge to 0.9 Volts according to the pulsed test.

11. A AAA battery, comprising:

an outer insulating layer;

an outer wall on the inside of the insulating layer and having an inner surface;

a conductive layer on the inner surface;

a cathode adjacent the conductive layer and containing at least 2.75 grams of manganese dioxide per cubic centimeter of cathode volume;

an anode inside the cathode; and a separator disposed between the cathode and the anode, wherein the battery takes at least 0.5 hours to discharge from 1.6 Volts to 1.I Volts according to the pulsed test.

12. The battery of claim 11, wherein the cathode contains at least 2.85 grams of manganese dioxide per cubic centimeter of cathode volume.

13. The battery of claim 11, wherein the cathode contains at least 2.9 grams of manganese dioxide per cubic centimeter of cathode volume.

14. The battery of claim 11, wherein the battery takes at least 0.5 hours to discharge from 1.6 Volts to 1.1 Volts according to the pulsed test.

15. The battery of claim 11, wherein the battery takes at least 0.6 hours to discharge from 1.6 Volts to 1.1 Volts according to the pulsed test.

16. A AAA battery, comprising:

an outer insulating layer;

an outer wall on the inside of the insulating layer and having an inner surface;

a conductive layer on the inner surface;

a cathode containing at least 2.75 grams of manganese dioxide per cubic centimeter of cathode volume;

an anode; and a separator disposed between the cathode and the anode, wherein the battery takes at least 0.80 hours to discharge from 1.6 Volts to 0.9 Volts according to the pulsed test.

17. The battery of claim 16, wherein the cathode contains at least 2.8 grams of manganese dioxide per cubic centimeter of cathode volume.

18. The battery of claim 16, wherein the cathode contains at least 2.85 grams of manganese dioxide per cubic centimeter of cathode volume.

19. The battery of claim 16, wherein the battery takes at least 0.85 hours to age from 1.6 Volts to 0.9 Volts according to the pulsed test.

20. The battery of claim 16, wherein the battery takes at least 0.90 hours to discharge from 1.6 Volts to 0.9 Volts according to the pulsed test.

21. The battery of claim 1, 6, 11, or 16, wherein the anode comprises zinc.

22. The battery of claims 1, 6, 11, or 16, wherein the conductive layer is selected from the group consisting of tin, cobalt, silver, and carbonaceous material.

23. The battery of claim 22, wherein the conductive layer is a carbonaceous material.

\* \* \* \* \*